Patented Mar. 1, 1949

2,462,999

UNITED STATES PATENT OFFICE 2,462,999

PREVENTION OF FOAMING IN THE CONCENTRATION OF SURFACE-ACTIVE AGENTS

Robert Blackburn Scott, Jr., Wilmington, Del., assignor to E. I. du Pont de Nemours & Company, Wilmington, Del., a corporation of Delaware No Drawing. Application December 11, 1945, Serial No. 634,411

8 Claims. (Cl. 252—321)

This invention deals with a process for the concentration of aqueous solutions of organic surface-active agents, and it is an object of this invention to provide a method for preventing or minimizing foaming during the boiling of such solutions.

Ordinarily, concentration by boiling of aqueous solutions of many organic surface-active agents, particularly those which produce desirable suds during use, is rendered difficult, if not economically impossible, by the attendant copious volumes of foam. In the past, this has sometimes been overcome by such methods as evaporation at temperatures below boiling, particularly with large surfaces exposed to strong drafts; or by boiling with frequent additions of sizable amounts of so-called anti-foam agents such as sec-octanol, rape-seed oil and the like. Such agents, however, remain in the concentrated product and interfere with its normal sudsing properties. To obtain a concentrated product capable of producing the suds frequently desired when using a surface-active agent, these anti-foam agents must be absent. In some cases the problem was solved by the use of relatively large separators for removing vapor from foam without the aid of anti-foam agents; this, however, entails the use of materially oversized equipment, and heat-losses are unavoidably higher than for normal concentrations. At best, the concentration processes were delicate and required excessive supervision.

Now, according to my invention, the above problem is solved neatly in the case of certain common types of surface-active agents, by adding to the aqueous solution an exceedingly small amount of n-butyl-trichlorsilane, or a silane compound which is equivalent thereto in alkaline aqueous medium, as more fully discussed hereinbelow.

n-Butyl-trichlorsilane, which may be represented by the formula $C_4H_9$—$SiCl_3$, has the admirable property of being effective as a foam reducing agent even when employed in very small concentrations, say in quantities less than 0.2% of the weight of the surface-active agent being concentrated. Of infinitely greater importance, however, is the fact that this agent reduces foaming only at about boiling temperatures or higher, and does not have any measurable effect at room temperatures or temperatures up to about 80° C.

Since the surface-active agents in question are generally used at temperatures below 75° C., the addition of butyl-trichlorsilane to the aqueous composition being concentrated has no deleterious effect on the practical properties and utilities of the resulting surface-active agent.

It is commonly accepted that butyl-trichlorsilane hydrolyzes in the hot, alkaline, aqueous mass into n-butyl-silane-triol, $C_4H_9$—$Si(OH)_3$, which immediately polymerizes by elimination of $H_2O$ units. In harmony with this theory, I find that other silicon compounds which are theoretically adapted to hydrolyze under the same conditions into n-butyl-silane-triol, for instance n-butyl-trialkoxy silanes, are equally effective for my purpose.

My invention is particularly effective when applied to the concentration of the following types of surface-active agents:

1. The long-chain alsyl compounds; "alsyl" being a short chemical name for aliphatic sulfonyl compounds, particularly those which are obtainable by reacting with a gaseous mixture of chlorine and sulfur dioxide in the presence of actinic light, or by reacting with sulfuryl chloride and catalysts in the presence of actinic light, upon saturated aliphatic or cycloaliphatic compounds, especially hydrocarbons. The immediate products of this reaction are aliphatic compounds having $SO_2Cl$ groups, and in some cases also chlorine, attached to one or more carbon atoms in the aliphatic chain. But in practice, these are then subjected to hydrolysis by means of aqueous caustic alkalis, which converts the sulfonyl chloride compounds into the corresponding alkali-metal sulfonates. It is in the evaporation of this aqueous hydrolysis mass that the hereinabove discussed problem of foaming arises.

2. Long-chain aliphatic betaines, as typified by C-cetyl-betaine.

3. Alcohol-sulfate type agents; that is, alkali-metal sulfates of long-chain aliphatic alcohols, as typified by lauryl-sodium-sulfate.

4. Cationic type surface-active agents, as typified by cetyl-trimethyl-ammonium bromide and other trialkyl-ammonium halides of long-chain aliphatic alcohols.

In summary, my invention appears effective in reducing the foaming with most of the wetting and dispersing agents which are normally met with in commerce, and whose properties are based on the use of a long-chain, saturated, aliphatic radical, (e. g. a chain of 12 C-atoms or more).

Without limiting my invention, the following examples are given to illustrate my preferred mode of operation. Parts mentioned are by weight.

Example 1

The aqueous solution used in this example was prepared essentially according to the procedure outlined in U. S. Patent No. 2,197,800.

A predominately paraffinic petroleum fraction, freed of aromatic and olefinic constituents, having a distillation range of 265–305° C. and a specific gravity of 0.801 was treated with a gaseous mixture of sulfur dioxide and chlorine under actinic light until approximately 45% of the hydrocarbons had been converted to aliphatic sulfone chlorides. The resultant sulfone chlorides were hydrolyzed with sodium hydroxide to the corresponding sodium aliphatic sulfonates, and the greater part of the unsulfonylated hydrocarbons were removed.

To 1610 parts of an aqueous solution containing about 5% of the above-described sulfonates, 1% unsulfonylated hydrocarbon, 2% ethyl alcohol and 1% sodium chloride, was added 0.25 part of a 0.1% solution of n-butyl trichlorsilane, n-$C_4H_9SiCl_3$, in dependip (a petroleum hydrocarbon fraction boiling between gasoline and kerosene). The pH of the aqueous solution was maintained between 7.5 and 9.5, while the solution was rapidly concentrated to 135 parts, by boiling under atmospheric pressure. Any foaming which occurred was insignificant, and was never more than enough to fill the vortex formed by the rotating agitator.

In the absence of the n-butyl polysilsesquioxane, formed by the n-butyl trichlorsilane, the above boiling solution foams so copiously that it overflows its container. Also, if butyl-trichlorsilane is added, but the temperature of the aqueous mass is decreased by boiling under reduced pressure, the foaming increases, until at about 80° C. care must be taken to avoid overflowing the container. At temperatures below about 75° C. the solution foams as copiously as when the silicon compound is absent.

The wetting and sudsing properties of the product obtained above were unimpaired at temperatures of normal usage, i. e., below 75° C.; its detergent properties were likewise not affected deleteriously.

The pH value of the boiling solution also has an effect upon the anti-foaming properties of the silane polymer. Within the pH range of 10 to 12.5, the anti-foaming activity of the polymer (at 100° C.) is markedly decreased. At a higher pH, however, it again functions properly.

Example 2

486 parts of an aqueous paste containing 3% cocoanut oil alcohols and 27% of the sodium salt of the sulfuric acid ester of these alcohols, prepared essentially as described in U. S. Patent No. 1,968,794, foamed over when boiled. After addition of 0.05 part of n-butyl-trichlorsilane, no appreciable foaming occurred, and the concentration was rapidly carried out until 360 parts of a very viscous paste was obtained.

Example 3

940 parts of an aqueous solution containing 20% of the quaternary ammonium compound prepared from trimethyl amine and the bromide of cocoanut-oil alcohols foamed over when attempts were made to concentrate it by boiling. The foam diminished upon addition of 0.05 part of n-butyl-trichlorsilane, and concentration was carried out until the residue amounted to 528 parts.

Example 4

1042 parts of an aqueous solution containing about 13% C-cetyl betaine prepared essentially according to U. S. Patent No. 2,129,264 foamed over when boiled. Addition of 0.1 part of n-butyl-trichlorsilane minimized the foaming and permitted concentration to a residue of 515 parts.

The n-butyl-trichlorsilane employed by me in this invention, may be obtained by treating silicon tetrachloride with an n-butyl-magnesium-halide in a manner similar to that described by Melzer (Ber. 41, 3390) for the propyl compound, and separating the butyl-trichloro compound by fractional distillation.

In the above examples, similar results are obtained if the n-butyl-trichlorsilane is replaced by an equivalent quantity of n-butyl-triethoxy-silane, $C_4H_9$—$Si(OC_2H_5)_3$, or n-butyl-tri(chlorethoxy)-silane, $C_4H_9$—$Si(OCH_2.CH_2Cl)_3$. Since these compounds would, judging from their structure, hydrolyze in aqueous, alkaline medium to give n-butyl-silane-triol, it is logically presumable that they lead to the same type of polymeric silane compound in situ as is obtained from n-butyl-trichlorsilane.

The advantages and improvements obtained by my invention will now be readily apparent. The advantages of economical concentration of aqueous solutions of the aliphatic sulfonic acids and their salts need no discussion. Often a paste product is preferred to a solution, particularly when shipping is involved. A more concentrated product is also preferred for spray-drying compositions containing the given surface-active agents.

As little as 0.00005 of 1% of n-butyl-trichlorsilane per part of alsyl compound being concentrated has been found effective as an anti-foam agent. On the other hand, as much as 1% if added to the product does not inhibit its sudsing properties under normal usage, nor the wetting and detergent properties of the same. The recommended proportion to add is between 0.0001 and 0.1 of 1%, based on the weight of the surface-active agent.

I claim as my invention:

1. A process of reducing foaming in the boiling of an alkaline, aqueous solution of a long-chain alkyl surface-active agent selected from the group consisting of long-chain aliphatic sulfonates, sulfates, betaines and quaternary ammonium salts, which comprises adding to said aqueous solution n-butyl trichlorsilane in quantity corresponding to between 0.00005% and 1% by weight based on the weight of said surface-active reagent in said solution.

2. A process of reducing foaming in the boiling of alkaline, aqueous solutions of long-chain aliphatic sulfonates, which comprises adding to the aqueous solution n-butyl-trichlorsilane in quantity corresponding to between 0.00005% and 1% by weight based on the weight of said long-chain aliphatic sulfonates in said solution.

3. A process of reducing foaming in the boiling of alkaline, aqueous solutions of long-chain alkyl betaines, which comprises adding to the aqueous solution n-butyl-trichlorsilane in quantity corresponding to between 0.00005% and 1% by weight based on the weight of said long-chain alkyl betaines in said solution.

4. A process of reducing foaming in the boiling of alkaline, aqueous solutions of long-chain alcohol sulfates, which comprises adding to the aqueous solution n-butyl-trichlorsilane in quantity corresponding to between 0.00005% and 1% by weight based on the weight of said long-chain alcohol-sulfates in said solution.

5. A process as in claim 2, the quantity of n-butyl-trichlorsilane added being between 0.0001 and 0.1 of 1% by weight of the long-chain aliphatic sulfonate in the solution being boiled.

6. A process as in claim 3, the quantity of n-butyl-trichlorsilane added being between 0.0001 and 0.1 of 1% by weight of the long-chain alkyl betaine in the solution being boiled.

7. A process as in claim 4, the quantity of n-butyl-trichlorsilane added being between 0.0001 and 0.1 of 1% by weight of the long-chain alcohol sulfate in the solution being boiled.

8. The process of concentrating an aqueous mass obtained in the alkaline hydrolysis of a long-chain aliphatic sulfonyl chloride compound followed by removal of excess unsulfonated material, which comprises adding to the aqueous mass a quantity of n-butyl-trichlorsilane corresponding to between 0.0001 and 0.1 of 1% of the weight of the hydrolyzed aliphatic sulfonyl chloride compound contained in said aqueous mass, whereby to reduce the foaming tendencies of said aqueous mass at boiling temperature, and boiling said aqueous mass at atmospheric pressure, while maintaining its alkalinity at a pH between 7.5 and 9.5, until the desired quantity of water has been removed.

ROBERT BLACKBURN SCOTT, Jr.

REFERENCES CITED

The following references are of record in the file of this patent:

UNITED STATES PATENTS

| Number | Name | Date |
|---|---|---|
| 2,375,007 | Larsen et al. | May 1, 1945 |
| 2,407,037 | Sowa | Sept. 3, 1946 |
| 2,416,503 | Trautman et al. | Feb. 25, 1947 |